April 10, 1956  H. A. MELDRUM  2,741,049
CORSAGE KIT
Filed Feb. 8, 1954
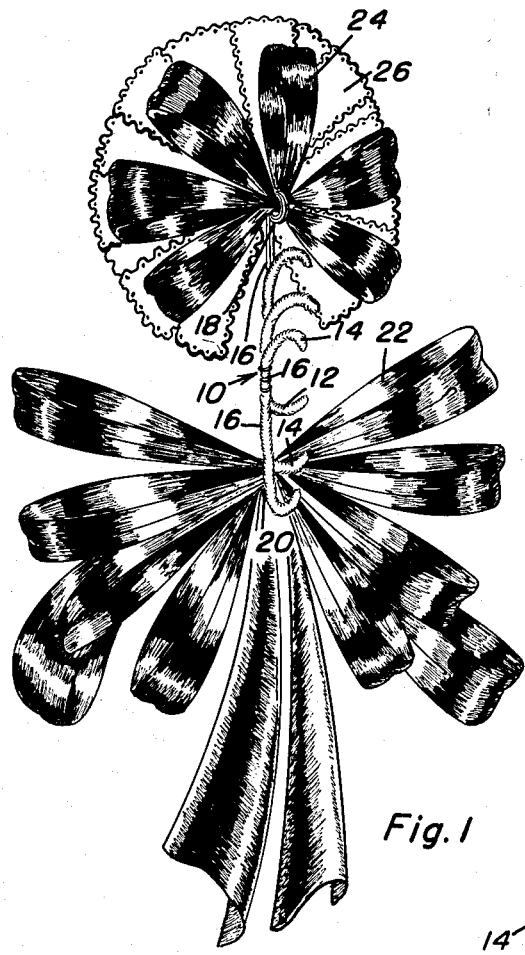
Fig. 1
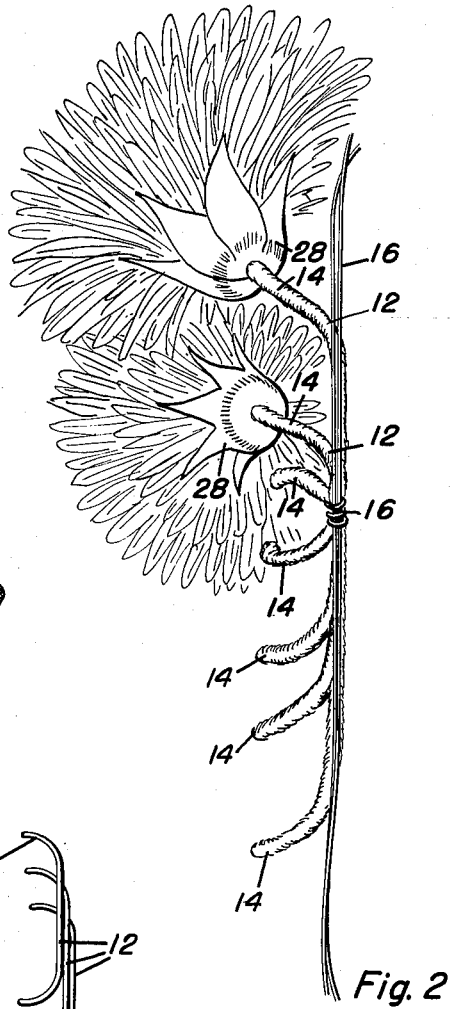
Fig. 2
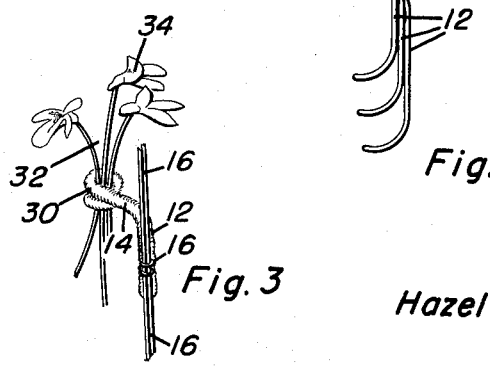
Fig. 3
Fig. 4
Hazel A. Meldrum
INVENTOR.
BY *Clarence A. O'Brien*
and *Harvey B. Jacobson*
Attorneys

United States Patent Office 2,741,049
Patented Apr. 10, 1956

2,741,049
CORSAGE KIT

Hazel A. Meldrum, South Gate, Calif.

Application February 8, 1954, Serial No. 408,867

3 Claims. (Cl. 41—12)

This invention relates to a corsage kit and more specifically provides a device having pre-tied ribbons and having means for securing flower heads thereon for producing an attractive corsage.

An object of this invention is to provide a corsage kit having pre-tied decorative ribbons and a plurality of wires having free ends for impaling flower heads thereon thereby forming an attractive corsage.

Another object of this invention is to provide a corsage kit which may be utilized by inexperienced people having access to various type flowers wherein the flowers may be positioned on the device of the preent invention for producing an attractive corsage.

Still another object of this invention is to provide a corsage kit which is simple in construction, easy to position flowers thereon, attractive when finished, well adapted for its purposes and relatively inexpensive to manufacture.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a perspective view of the corsage kit of the present invention prior to the positioning of the flower heads thereon;

Figure 2 is a perspective view showing the flower heads secured to the free ends of the wire members and the ribbons removed;

Figure 3 is a perspective view showing one of the wire members wrapped around the stems of a plurality of small flowers; and Figure 4 is an exploded group view showing the arrangement of the plurality of bendable chenille wires wherein they are secured together in staggered relation thereby providing vertically spaced free end portions for ease of positioning the flower heads.

Referring now specifically to the drawings, it will be seen that the numeral 10 generally designates the corsage kit of the present invention and includes a plurality of bendable chenille wires 12 of equal length and secured at their straight body portions substantially in staggered relation wherein the free end portions 14 of the wires are vertically spaced. The wires 12 are secured by a bendable wire 16 having upwardly and downwardly extending portions terminating in suitable loops 18 and 20 for receiving and securing a pre-tied ribbon 22 at the lower end and a pre-tied ribbon 24 at its upper end together with a lace type ribbon 26 all of which decorate the corsage kit 10 of the present invention. As illustrated in Figure 2, the free ends 14 of the bendable chenille wires 12 impale flower heads 28 as desired thereby spacing and arranging the flower heads 28 in a most attractive and pleasing manner. Further, it will be seen that the end portions 14 of the bendable chenille wires 12 may be looped as indicated by the numeral 30 for encircling a plurality of stems 32 on small flowers 34 such as sweet peas or the like. The free ends 14 may be used to impale flower heads 28 such as those found on gardenias, carnations, roses or the like.

The operation of the device will be readily understood. The corsage kit 10 may be made up in several basic colors such as white, yellow, pink or the like and retained in a suitable plastic corsage container usually found in florist shops. When it is desired to construct a corsage the flower heads 28 are impaled on the free ends 14 of the wires 12 and due to the bendability of the wires 12 and the chenille covering thereon, the flower heads 28 may be attractively arranged and positioned in relation to each other and in relation to the ribbons 22, 24, and 26. Further, the chenille wires 12 may be dyed a suitable green as well as the wires 16 thereby creating the effect of stems for the flower heads 28. Obviously, the completed corsage may be kept in the plastic corsage box in the refrigerator until the flowers are dead wherein the flower heads 28 may be removed thereby permitting re-use of the corsage kit 10. The corsage kit 10 may be utilized with the ribbon 22 and the flower heads 28 being compatible or contrasting as desired. Further, sweet peas or other small flowers may be secured thereto by encircling the stems 32 by looping the free end 14 of the bendable wires 12 as illustrated by the numeral 30. The small stems 32 are all placed in one direction so that the flowers of one group cover the stems of the next adjacent group except the last group of flowers are reversed thereby hiding the stems and presenting a pleasing appearance. It will be seen that the corsage kit 10 of the present invention provides a wide variety of corsages wherein an inexperienced person such as a home gardener may construct professional looking corsages without any trouble and with very little expense. Due to the particular construction of the bendable wires 12 and 16, the corsage may be shaped in the desired manner with very little work.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claims.

What is claimed as new is as follows:

1. A corsage kit comprising a plurality of first covered bendable chenille wires having free ends adapted to hold flower heads, a second bendable wire securing the central portion of said first wires together, and a plurality of decorative ribbons secured to the end portions of said second wire.

2. The structure as defined in claim 1 wherein said first bendable wires are of equal length and secured together in staggered relation thereby providing spaced free end portions.

3. A corsage kit comprising a plurality of first bendable covered wires having free ends, said first bendable wires being equal in length and positioned alongside each other in staggered relation thereby forming spaced free ends for holding flower heads, a second bendable wire encircling the central portions of said first wires thereby securing said first wires together, said second wire extending longitudinally beyond said first wires and terminating in remote loops for retaining decorative ribbon thereon thereby forming a corsage.

References Cited in the file of this patent

UNITED STATES PATENTS

| | | |
|---|---|---|
| 1,769,198 | Albany | July 1, 1930 |
| 2,583,237 | Stegena | Jan. 22, 1952 |
| 2,624,968 | Polizzi | Jan. 13, 1953 |